Oct. 30, 1934.  W. B. ELMER  1,978,704
THERMOMETRY
Filed Oct. 11, 1930
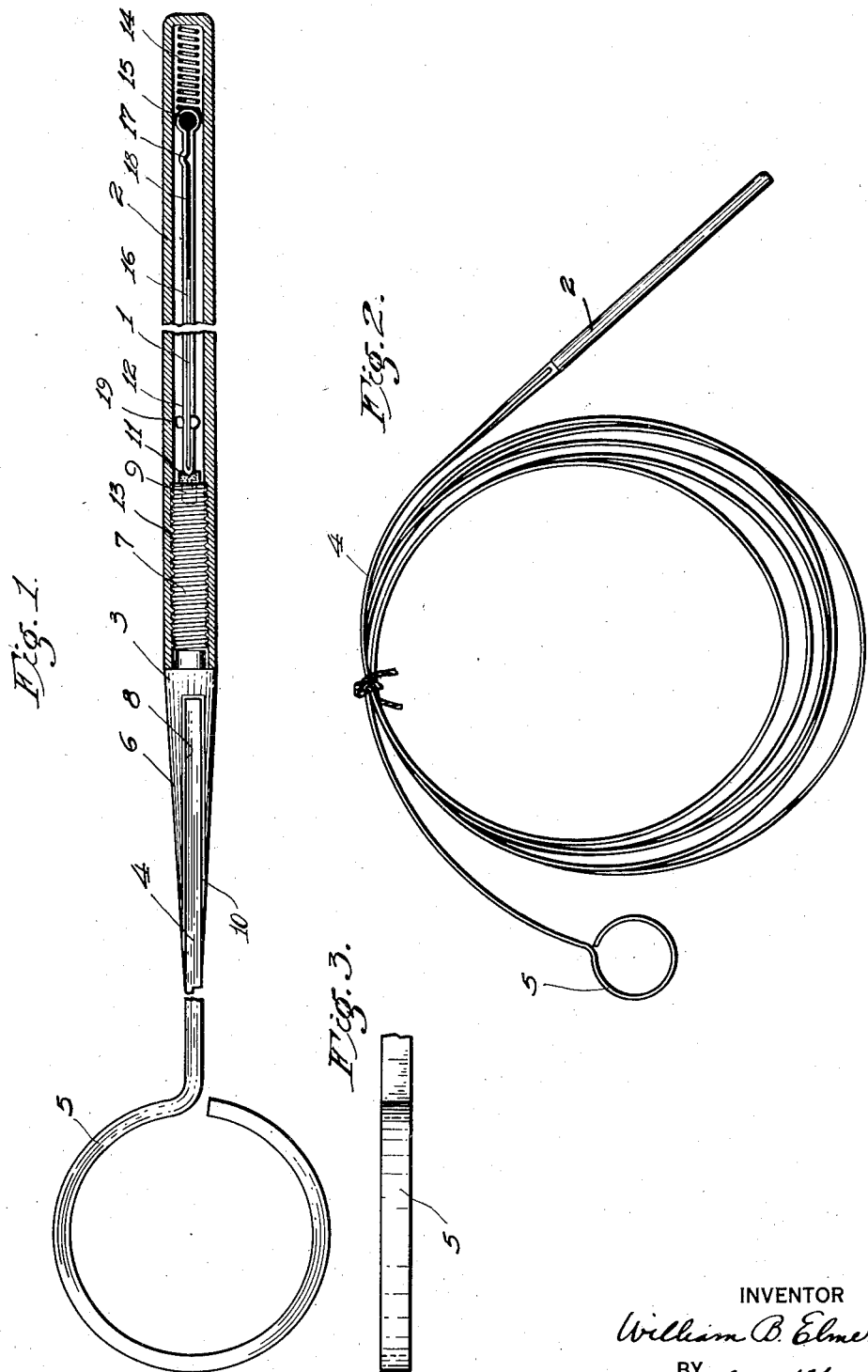
INVENTOR
William B. Elmer
BY
ATTORNEY Patented Oct. 30, 1934

1,978,704

UNITED STATES PATENT OFFICE 1,978,704

THERMOMETRY

William B. Elmer, Roxbury, Mass.

Application October 11, 1930, Serial No. 488,056

9 Claims. (Cl. 73—52)

My invention relates to thermometry and particularly to a device for recording temperatures of inaccessible places.

Heretofore, when the temperature of a cable within an insulating and weatherproof sheathing was required, it was necessary to record the exterior rise in temperature and compute the interior temperature, or to employ a thermal couple and exceedingly expensive recording equipment, in order to ascertain the interior temperature.

I propose to employ a standard thermometer in a casing having a long flexible extension which can be utilized as a probe to reach the point at which a record of the temperature is desired.

It is, therefore, one object of my invention to provide a thermometer on the end of a stiff flexible member that shall be capable of being forced by the member into a region where a record of the temperature is desired.

A further object of my invention is to provide a thermometer of the above-mentioned type that is positive, reliable and capable of retaining the maximum temperature reading until restored to its original position by a positive act.

A further object of my invention is to provide a temperature probe of the above-mentioned type that is capable of being wound into a compact structure without effecting the reliability of the device.

A still further object of my invention is to provide a casing for a thermometer which is provided with flexible centering and cushioning members at each of its ends that shall center the thermometer and protect it from shock delivered by the ends and sidewalls of the casing.

My invention will best be understood by referring to the following specification, taken in conjunction with the accompanying drawing, wherein:

Figure 1 is an enlarged broken view, partly in section and partly in elevation, of a thermometry device embodying my invention, Fig. 2 is a view in elevation of the device shown in Fig. 1, wound into a compact unit, and Fig. 3 is a side view of a portion of the structure shown in Fig. 1.

My invention comprises, in general, a thermometer 1 contained within a casing 2 which is screwed onto a threaded end 3 of a pushing member 4, all of which comprises a temperature probe which will be described more fully hereinafter.

The pushing member 4, as shown in Fig. 1, is made from $\frac{1}{16}''$ to $\frac{1}{8}''$ steel fish wire having a length of substantially twelve feet. The one end of the wire is bent into a circle to provide a handle portion 5 which prevents the probe from being thrust too far into a casing or other inaccessible place. The wire, as illustrated, is rectangular in shape to provide the required strength and flexibility to enable it to be pushed through curved duct and also to be wound into a compact coil, as shown in Fig. 2. It is to be understood that, while the preferred cross-section of the pushing member 4 is that shown in Fig. 1, nevertheless, other dimensions and shapes, such as a square, a triangle, an ellipse, a circle, etc. could be substituted and satisfactory results effected.

The threaded end 3 is provided with a tapered portion 6, the base of which is adjacent to the threaded section 7 and has a diameter substantially equal to that of the casing 2. The tapered portion 6 is provided with a slot 8 into which the end of the pushing member 4, opposite to that constituting the handle portion 5, is securely fastened by being riveted, soldered, brazed or welded, or any combination thereof, as at 10, to constitute a unit structure. The end of the threaded section 7 opposite to that having the tapered portion is provided with a recess 9 into which a flexible member 11 is inserted for the purpose of cushioning and centering the stem end 12 of the thermometer 1. The flexible member 11 may be a metal spring but is shown in the drawing as being made of leather, felt, rubber or other similar resilient material.

The casing 2 is made of metal, such as iron, copper, or like good heat-conducting material, having a closed and an open end. The open end is provided with an internal thread 13, which engages with the thread 7 on the threaded member 3, to constitute a closed unit structure. The closed end of the casing 2 is provided with a flexible member, herein shown as a spring 14, which is employed to center the thermometer bulb 15 within the casing 2 and to bias the thermometer against the cushioning or centering member 11.

The thermometer 1, illustrated in Fig. 1 in its preferred form, is one which records maximum temperatures and is similar to, except for scale ranges, a clinical thermometer employed by physicians. The tube 16 of this thermometer is made extremely flat and narrow just above the bulb 15, as illustrated at 17 on the drawing. The mercury 18, or other liquid, will readily pass through the constriction 17 in rising, but as it recedes, because of the presence of a temperature drop, capillary force causes the column to separate at the restricted point, leaving the upper part of the mercury column to mark the maximum temperature point. To set the thermometer, the separate portion of the liquid is caused to join the main portion in the bulb 14 by a vigorous shake.

While the above-described thermometer is the preferred form, it is to be understood that the employment of other types, such as non-recording or those recording minimum temperatures is within the purview of my present invention. The maximum and minimum temperature recording thermometers of Rutherford could readily be substituted for the above described preferred form of recording thermometer.

Projections 19 are provided on the stem 12, in order to aid the centering of the thermometer in the casing 2. Lacking such projections, a washer made of leather or similar material may be slid onto the stem 12 to effect the same result.

With my device, thus constructed, the maximum temperature at any point may be ascertained by inserting the casing end of the device into the region in which a temperature record is desired. The devices can then be marked and, after a suitable time interval, can be collected and at the convenience of the operator the maximum temperature may be read and recorded.

It will thus be seen that I have provided a novel device for obtaining the temperature of inaccessible regions. The device is positive, simple in operation and economical in construction and can be made of any length, in order to reach the most inaccessible regions.

While I have described and illustrated but a single embodiment of my invention, it is to be understood, by those skilled in the art, that many modifications, additions, omissions and substitutions may be made therein without departing from the spirit and scope of my invention as set forth in the accompanying claims.

I claim as my invention:

1. A probe for obtaining temperature indications comprising a thermometer supported at the end of a flexible pushing device.

2. A temperature probe comprising a stiff flexible member of predetermined length, a thermometer and means for retaining said thermometer in advance of said member.

3. A temperature probe comprising a flexible pushing member having such a cross sectional area as to effect a greater ease of flexing in some directions than in others and a thermometer secured to said member.

4. A temperature probe comprising a standard steel fish wire to be employed as a pushing means, a thermometer and means for retaining said thermometer in advance of said pushing means.

5. A temperature probe comprising a stiff flexible member of predetermined length, a thermometer and a casing detachably secured to said member for supporting said thermometer in advance of said member.

6. A temperature probe comprising a stiff flexible member of predetermined length, a thermometer and a casing for said thermometer detachably secured in prolongation of said member.

7. A temperature probe comprising a stiff flexible member of predetermined length, a threaded member having a tapered portion at one end that is provided with a slot in which said member is inserted means for joining said members to constitute a unit structure, a casing, and a temperature registering device secured to said threaded member by said casing.

8. A temperature probe comprising a stiff flexible member of predetermined length, a threaded member having a tapered portion at one end that is provided with a slot in which said member is inserted means for joining said members to constitute a unit structure, a casing provided with a thread which is adapted to engage the thread on said threaded member to constitute a unit member with said unit structure in prolongation thereof, and a temperature registering device disposed in such casing.

9. A probe for obtaining temperature indications comprising a thermometer supported by a flexible pushing device.

WILLIAM B. ELMER.